(12) United States Patent
Brouwer et al.

(10) Patent No.: US 9,198,338 B2
(45) Date of Patent: Dec. 1, 2015

(54) SOD HARVESTING APPARATUS AND SYSTEM FOR DISPOSING OF A DEFECTIVE SOD ROLL

(71) Applicant: 1045929 Ontario Limited, Keswick (CA)

(72) Inventors: Gerardus J. Brouwer, Keswick (CA); Robert Milwain, Keswick (CA)

(73) Assignee: 1045929 ONTARIO LIMITED, Keswick (CA)

( * ) Notice: Subject to any disclaimer, the term of this patent is extended or adjusted under 35 U.S.C. 154(b) by 68 days.

(21) Appl. No.: 14/187,868

(22) Filed: Feb. 24, 2014

(65) Prior Publication Data

US 2014/0238709 A1    Aug. 28, 2014

Related U.S. Application Data

(60) Provisional application No. 61/768,763, filed on Feb. 25, 2013.

(51) Int. Cl.
*A01B 45/04* (2006.01)

(52) U.S. Cl.
CPC ..................................... *A01B 45/04* (2013.01)

(58) Field of Classification Search
CPC .............................. A01B 45/04; A01B 45/045
USPC ...................................................... 172/19, 20
See application file for complete search history.

(56) References Cited

U.S. PATENT DOCUMENTS

| | | | |
|---|---|---|---|
| 4,462,287 A | 7/1984 | Weis et al. | |
| 5,230,602 A | 7/1993 | Schouten | |
| 6,364,027 B1 | 4/2002 | Tvetene et al. | |
| 6,527,502 B2 * | 3/2003 | Leijenaar .................. | 414/792 |
| 6,607,082 B2 | 8/2003 | Biagioni et al. | |
| 6,681,864 B2 | 1/2004 | Tvetene et al. | |
| 6,779,610 B2 * | 8/2004 | Brouwer et al. ............ | 172/20 |
| 6,783,318 B2 | 8/2004 | Tvetene et al. | |
| 7,000,706 B1 * | 2/2006 | Dover ......................... | 172/19 |
| 8,505,643 B2 | 8/2013 | Brouwer et al. | |
| 2004/0060713 A1 | 4/2004 | Brouwer et al. | |

FOREIGN PATENT DOCUMENTS

| | | |
|---|---|---|
| CA | 2463470 | 1/2004 |
| CA | 2435934 | 3/2004 |
| EP | 982106 | 3/2000 |

OTHER PUBLICATIONS

International Search Report and the Written Opinion of the International Searching Authority for PCT Application No. PCT/CA2014/000131, Mailing date, Jul. 2, 2014.

\* cited by examiner

*Primary Examiner* — Matthew D Troutman (74) *Attorney, Agent, or Firm* — Bereskin & Parr LLP/S.E.N.C.R.L., s.r.l.

(57) ABSTRACT

A system for disposing of a defective sod roll from a sod harvester is disclosed. The system includes: (i) a transport conveyor; (ii) an accumulator located behind the transport conveyor, such that a gap is defined between a rear end of the transport conveyor and a front end of the accumulator; and (iii) a movable tray located proximate to the gap. The tray moves between a retracted position and an extended position. When the tray is in the retracted position, the gap is open and a receiving surface of the tray is in a generally horizontal orientation. When the tray is in the extended position, the tray is located within the gap to receive the sod roll from the transport conveyor.

34 Claims, 7 Drawing Sheets

SOD HARVESTING APPARATUS AND SYSTEM FOR DISPOSING OF A DEFECTIVE SOD ROLL

REFERENCE TO RELATED APPLICATIONS

This application claims the benefit of U.S. Provisional Application No. 61/768,763 filed on Feb. 25, 2013, which is incorporated by reference herein in its entirety.

FIELD

The Applicant's teachings described herein relate generally to a sod harvester configured to cut strips of sod and form the strips into rolls.

INTRODUCTION

Sod harvesters which cut a strip of sod from a field and then form the strip into discrete rolls of sod are well known. In such harvesters, the sod rolls formed by the harvester are usually stacked on a pallet or other holder. In some cases, one or more of the sod rolls formed by the harvester may be determined to be defective or otherwise unacceptable for sale or delivery to a customer.

SUMMARY

According to one aspect of the invention, a sod harvesting apparatus for harvesting a strip of sod into a sod roll is provided. The apparatus comprises: (i) a cutting head assembly adapted to cut the strip of sod from the field; (ii) a transport conveyor located behind the cutting head for conveying the strip of sod from the cutting head; (iii) a roll-up assembly operatively connected to the transport conveyor, wherein the roll-up assembly is adapted to form the strip of sod into the sod roll; (iv) an accumulator located behind the transport conveyor, wherein a gap is defined between a rear end of the transport conveyor and a front end of the accumulator; and (v) a movable tray located proximate to the gap. The tray moves between a retracted position and an extended position. When the tray is in the retracted position, the gap is open and a receiving surface of the tray is in a generally horizontal orientation. When the tray is in the extended position, the tray is located within the gap to receive the sod roll from the transport conveyor.

According to a second aspect of the invention, a system for disposing of a defective sod roll from a sod harvester is provided. The system comprises: (i) a transport conveyor; (ii) an accumulator located behind the transport conveyor, wherein a gap is defined between a rear end of the transport conveyor and a front end of the accumulator; and (iii) a movable tray located proximate to the gap. The tray moves between a retracted position and an extended position. When the tray is in the retracted position, the gap is open and a receiving surface of the tray is in a generally horizontal orientation. When the tray is in the extended position, the tray is located within the gap to receive the sod rot from the transport conveyor.

Reference numerals may be repeated amongst the figures to indicate corresponding or analogous elements.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Figure 1:
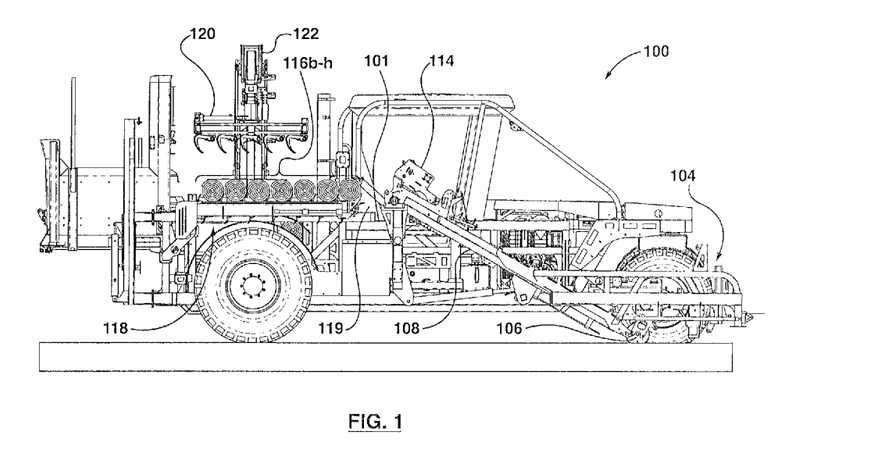
FIG. 1 is a side view of an example sod harvester with a tray in the retracted position.

FIG. 1 shows a self-propelled sod harvester 100. However, those skilled in the art will understand that the embodiments described herein are also applicable to a sod harvester that is towed by a supporting vehicle, such as a tractor.

The sod harvester 100 has a frame 101, and a sod cutting head 104 mounted to a front end of a transport conveyor 108. Optionally, the cutting head 104 may include a ground roller 106 located behind a conventional cross cut blade (not shown). The cross cut blade may be driven downwardly at periodic intervals (by any suitable conventional mechanism) to form a transverse cut in the ground, so that the strip of sod which is to be cut by the cutting head 104 will be cut into individual strips. The strip of sod to be cut travels beneath the ground roller 106 and is then undercut by a conventional undercutting knife (not shown), which includes side cutting blades, one at each side thereof. The undercutting knife can be mounted on arms which are reciprocated forwardly and rearwardly in conventional fashion by a hydraulic motor (not shown), to cut a strip of sod.

Figure 2:
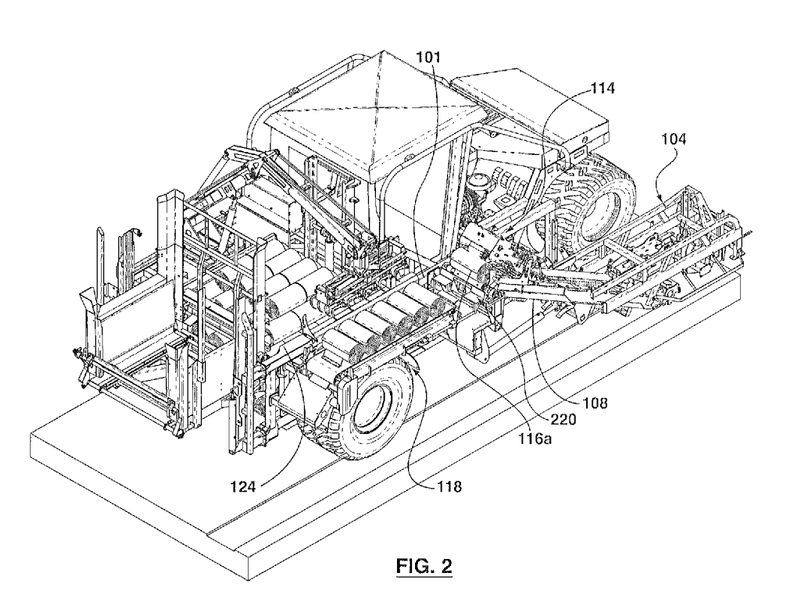
FIG. 2 is a perspective view of an example sod harvester with the tray in the extended position

Referring now to FIGS. 1 and 2, the transport conveyor 108 is preferably inclined to receive the cut sod strips and convey them away from the cutting head 104. A conventional sod roll-up assembly 114 is mounted at a rear end of the transport conveyor 108. The sod roll-up assembly rolls each sod strip into a sod roll 116a. The sod roll assembly includes a sensor (not shown) that preferably detects the trailing end of a sod strip (not shown) being rolled up into the sod roll 116a. After being formed into sod rolls 116, the rolls of sod 116 are transferred to an accumulator 118 located behind the transport conveyor 110. The accumulator is mounted on frame 101 and will be described in more detail below. Those skilled in the art will understand that, rather than detecting the trailing edge of the sod strip, the sensor may detect the presence or position of the sod roll in any other suitable fashion.

After the sensor detects the trailing edge of the sod strip being formed into sod roll 116a, it communicates this information to a processor (not shown), which in turn sends a command to the roll-up assembly 114 to release the sod roll 116a from the rear end of the transport conveyor 108.

Referring to FIG. 1, a gap 119 exists between the rear end of the transport conveyor 108 and the front end of the accumulator 118. In addition, the rear end of the transport conveyor 108 is preferably located above the surface of the accumulator 118.

The sod harvester also includes a conventional sod roll pick-up head 120 mounted to a conventional sod roll pick up arm 122 which picks up the sod rolls 116b-h and deposits the sod rolls on a pallet 124 (shown in FIG. 2).

Figure 3A:
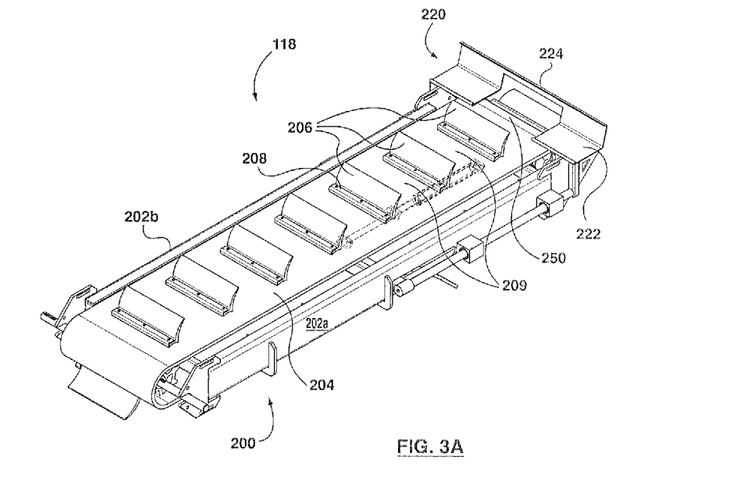
FIG. 3A is a perspective view of an exemplary accumulator for the sod harvester.
Figure 3B:
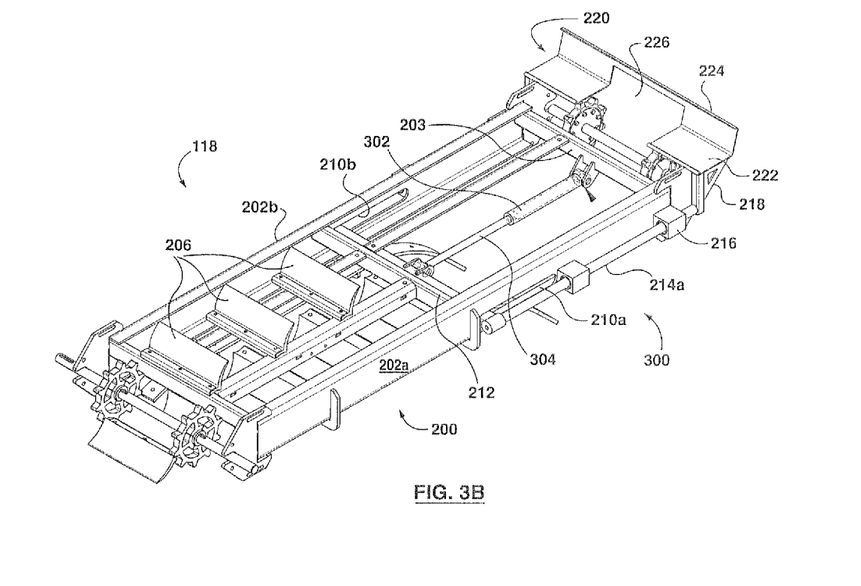
FIG. 3B is a perspective view of the accumulator of FIG. 3A with the belt and several retaining members removed for clarity.
Figure 3C:
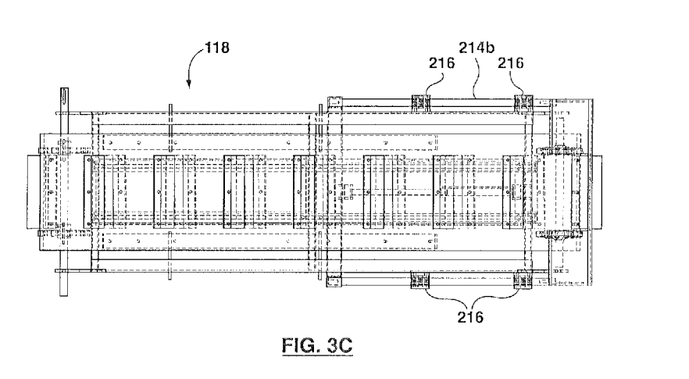
FIG. 3C a top view of the accumulator of FIG. 3A.

Referring now to FIGS. 3A-3C, the accumulator 118 has a frame 200 with a pair of side walls 202a,b and a front wall 203. The accumulator 118 is preferably an indexed conveyor which moves a conveyor belt 204 in an index or step-wise fashion away from the transport conveyor 108. A number of retaining members 206 are secured in any suitable fashion (for example, by fasteners 208) to the conveyor belt 204. The retaining members 206 are oriented general perpendicularly to the direction of movement of the conveyor belt 204. Each portion of the conveyor belt 204 between two adjacent retaining members 206 provides a landing zone 209 which accommodates a sod roll 116. For clarity, only two landing zones 209 are identified in FIG. 3A.

As best shown in FIGS. 3B and 3C, slot 210a and slot 210b are provided in side walls 202a, 202b, respectively. A cross bar 212 is received in the slots such that the opposing ends of the cross bar protrude exteriorly of the side walls. A first rod 214a and a second rod 214b are secured to each end of the cross bar 212. The rods extend horizontally and run generally parallel to side walls 202a, 202b toward the front end of the accumulator 118. The rods pass through sleeves 216 secured to the side walls 202a,b. The front ends of the rods 214a,b are secured to a tray support 218. A tray 220 is mounted on the tray support in any suitable fashion, such as by welds. The tray 220 has a generally planar horizontal receiving surface 222 and a vertically extending planar shoulder 224 projecting from the front edge of the receiving surface. In an alternative embodiment, the shoulder 224 could be replaced with a set of bars (not shown). An opening, such as a cutout 226, is formed in the central portion of receiving surface 222 and shoulder 224. The cutout 226 permits the retaining members 206 to pass through the tray during movement of the conveyor belt 204.

Referring now to FIG. 3B, an actuating assembly 300 is preferably mounted to the front wall 203 of the accumulator 118 to permit the tray 220 to extend into the gap 119 (shown in FIG. 1) and to retract. The actuating assembly includes a hydraulic cylinder 302 mounted to the front wall 203. A hydraulic piston 304 has one end received in the cylinder 302 in a conventional manner, and an opposing end connected to the cross bar 212.

The operation of the sod harvester 100 will now be described with reference to FIGS. 1-5. As the sod harvester travels forward, the sod cutting head 104 cuts a sod strip (not shown) from the field and then cross-cuts the sod strip to an appropriate length for forming the sod roll 116a, all in a conventional manner. The sod strip travels up the transport conveyor 108 toward the sod roll-up assembly 114. The sod roll-up assembly captures the leading edge of the sod strip and forms the sod strip into sod roll 116a. When the sensor detects the trailing edge of the sod strip, the sensor communicates this information to the processor, which in turn sends a command to the sod roll-up assembly 114 to release the sod roll 116a. At the same time, the processor sends a command to the actuating assembly 300 to move the tray 220 into the extended position shown in FIG. 2. The hydraulic piston 304 of the actuating assembly 300 causes the cross bar 212 to slide in slots 210a,b, which in turn moves the rods 214a,b connected to the tray 220.

Figure 4:
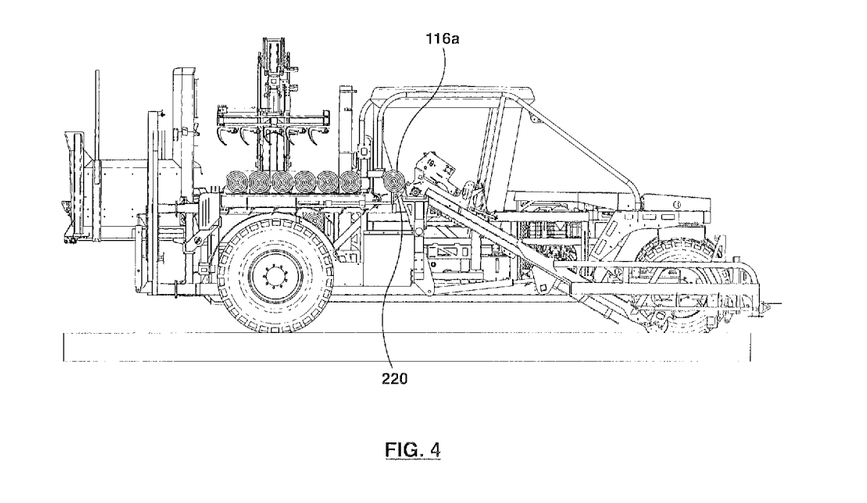
FIG. 4 is a side view of an example sod harvester with the tray in the extended position and a sod roll on the tray.

As best shown in FIG. 4, the sod roll 116a released by the sod-roll up assembly 114 falls onto the receiving surface 222 of tray 220. The sod roll 116a is prevented from falling forward by shoulder 226. Preferably, the tray 220 is automatically moved back into the retracted position after a period of time, which period of time is preferably synchronized to the time interval for indexing the accumulator 118 by one landing zone.

As best shown in FIG. 1, when the tray 220 is moved back into the retracted position, the tray moves the sod roll 116a onto the forwardmost landing zone 250 (shown in FIG. 3A) of the accumulator 118. As the tray moves into the retracted position, the accumulator 118 indexes one landing zone, leaving the forwardmost landing zone 250 open for the next sod roll.

Figure 5:
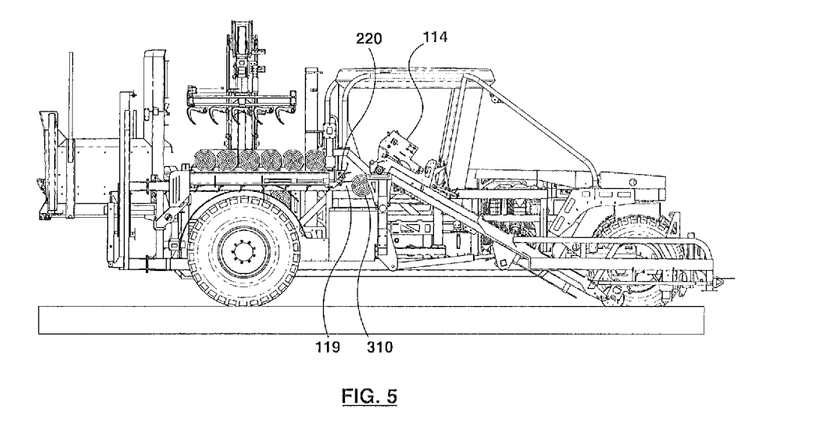
FIG. 5 is a side view of an example sod harvester with the tray in the retracted position showing a defective sod roll being dropped.

The above described operation then repeats for each acceptable sod roll. However, as shown in FIG. 5, if the operator notices a defective sod roll 310 being released by the sod roll-up assembly 114, the operator can override the processor command to move the tray 220 into the extended position. In order to dispose of the defective sod roll, the tray remains in the retracted position when the sod roll is released by the sod roll-up assembly 114, thereby causing the defective sod roll 310 to be dropped from the sod harvester 100 by permitting the defective sod roll to fall through the gap 119.

What has been described above has been intended to be illustrative of the invention and non-limiting and it will be understood by persons skilled in the art that other variants and modifications may be made without departing from the scope of the invention as defined in the claims appended hereto.

The invention claimed is:

1. A sod harvesting apparatus for harvesting a strip of sod from a field and forming the strip of sod into a sod roll, the sod harvesting apparatus comprising:
    a) a cutting head assembly adapted to cut the strip of sod from the field;
    b) a transport conveyor located behind the cutting head for conveying the strip of sod from the cutting head;
    c) a roll-up assembly operatively connected to the transport conveyor, wherein the roll-up assembly is adapted to form the strip of sod into the sod roll;
    d) an accumulator located behind the transport conveyor, wherein a gap is defined between a rear end of the transport conveyor and a front end of the accumulator; and
    e) a movable tray located proximate to the gap;
    wherein the tray is movable between a retracted position and an extended position;
    wherein, when the tray is in the retracted position, the gap is open and a receiving surface of the tray is in a generally horizontal orientation;
    wherein, when the tray is in the extended position, the tray is located within the gap to receive the sod roll from the transport conveyor; and
    wherein the tray is slidable in a generally horizontal direction between the retracted and extended positions.

2. The sod harvesting apparatus of claim 1, wherein the tray is adapted to move into the extended position to receive the sod roll from the transport conveyor and then move into the retracted position to deliver the sod roll to the accumulator.

3. The sod harvesting apparatus of claim 2, wherein the tray is adapted to remain in the retracted position to permit a rejected sod roll to fall down.

4. The sod harvesting apparatus of claim 3, wherein the tray is operatively connected to the accumulator.

5. The sod harvesting apparatus of claim 4, wherein the tray further comprises:
   a) a tray support, wherein the receiving surface rests on the tray support;
   b) a vertically extending planar shoulder connected to a front edge of the receiving, surface;
   wherein an opening is defined in a central portion of the receiving surface and the shoulder.

6. The sod harvesting apparatus of claim 5, wherein the accumulator further comprises an accumulator frame having a pair of spaced-apart side walls, wherein a longitudinally extending slot is defined in each side wall.

7. The sod harvesting apparatus of claim 6 further comprising a pair of rods, wherein each rod is connected at one end to the tray support and at an opposing end to a cross bar, wherein each rod is located exteriorly of a corresponding side wall, wherein each rod is oriented generally horizontally, wherein the crossbar is oriented transversely to the side walls and is slidably received in the slots, wherein each end of the crossbar protrudes exteriorly of the side walls, wherein each rod is connected to a corresponding end of the crossbar.

8. The sod harvesting apparatus of claim 7 further comprising an actuating assembly adapted to slide the crossbar along the slots, thereby sliding the tray.

9. The sod harvesting apparatus of claim 8, wherein the actuating assembly comprises a hydraulic cylinder connected a front wall of the accumulator and a piston, wherein the piston comprises a first end slidably received in the hydraulic cylinder and a second end connected to the crossbar.

10. The sod harvesting apparatus of claim 9, wherein the accumulator comprises:
    a) a conveyor belt adapted for indexed movement, and
    b) a plurality of spaced apart retaining members connected to the conveyor belt, wherein the plurality of retaining members are oriented transversely to the conveyor belt.

11. The sod harvesting apparatus of claim 10, wherein, when the tray is in the retracted position, the retaining members are adapted to pass through the opening.

12. The sod harvesting apparatus of claim 10, wherein a portion of the conveyor belt between two adjacent retaining members defines a receiving zone adapted to transport the sod roll.

13. The sod harvesting apparatus of claim 12, wherein the conveyor belt is adapted to advance by one receiving zone.

14. The sod harvesting apparatus of claim 8, further comprising a sensor located proximate to the roll-up assembly, wherein the sensor is adapted to communicate with a processor, the processor adapted to control the actuating assembly.

15. The sod harvesting apparatus of claim 13, wherein the sensor is adapted to detect when the sod roll is ready to be released from the transport conveyor.

16. The sod harvesting apparatus of claim 14, wherein the sensor sends a signal to the processor when the sensor detects a trailing edge of the sod strip being formed into the sod roll.

17. The sod harvesting apparatus of claim 16, wherein, upon receiving the signal, the processor sends a command to the actuating assembly to move the tray from the retracted position to the extended position.

18. A system for disposing of a defective sod roll from a sod harvester, the system comprising:
    a) a transport conveyor;
    b) an accumulator located behind the transport conveyor, wherein a gap is defined between a rear end of the transport conveyor and a front end of the accumulator; and
    c) a movable tray located proximate to the gap;
    wherein the tray is movable between a retracted position and an extended position;
    wherein, when the tray is in the retracted position, the gap is open and a receiving surface of the tray is in a generally horizontal orientation;
    wherein, when the tray is in the extended position, the tray is located within the gap to receive the sod roll from the transport conveyor; and
    wherein the tray is slidable in a generally horizontally direction between the retracted and extended positions.

19. The system of claim 18, wherein the tray is adapted to move into the extended position to receive the sod roll from the transport conveyor and then move into the retracted position to deliver the sod roll to the accumulator.

20. The system of claim 19, wherein the tray is adapted to remain in the retracted position to permit a rejected sod roll to fall down.

21. The system of claim 20, wherein the tray is operatively connected to the accumulator.

22. The system of claim 21, wherein the tray further comprises:
    a) a tray support, wherein the receiving surface rests on the tray support;
    b) a vertically extending planar shoulder connected to a front edge of the receiving surface;
    wherein an opening is defined in a central portion of the receiving surface and the shoulder.

23. The system of claim 22, wherein the accumulator further comprises an accumulator frame having a pair of spaced-apart side walls, wherein a longitudinally extending slot is defined in each side wall.

24. The system of claim 23 further comprising a pair of rods, wherein each rod is connected at one end to the tray support and at an opposing end to a cross bar, wherein each rod is located exteriorly of a corresponding side wall, wherein each rod is oriented generally horizontally, wherein the crossbar is oriented transversely to the side walls and is slidably received in the slots, wherein each end of the crossbar protrudes exteriorly of the side walls, wherein each rod is connected to a corresponding end of the crossbar.

25. The system of claim 24 further comprising an actuating assembly adapted to slide the crossbar along the slots, thereby sliding the tray.

26. The system of claim 25, wherein the actuating assembly comprises a hydraulic cylinder connected a front wall of the accumulator and a piston, wherein the piston comprises a first end slidably received in the hydraulic cylinder and a second end connected to the crossbar.

27. The system of claim 26, wherein the accumulator comprises:
    a) an accumulator conveyor adapted for indexed movement, and
    b) a plurality of spaced apart retaining members connected to the accumulator conveyor, wherein the plurality of retaining members are oriented transversely to the accumulator conveyor.

28. The system of claim 27, wherein when the tray is in the retracted position, the retaining members are adapted to pass through the opening.

29. The system of claim 27, wherein a portion of the accumulator conveyor between two adjacent retaining members defines a receiving zone adapted to transport the sod roll.

30. The system of claim 29, wherein the accumulator conveyor is adapted to advance by one receiving zone.

31. The system of claim 25 further comprising a sensor adapted to communicate with a processor, the processor adapted to control the actuating assembly.

32. The system of claim 31, wherein the sensor is adapted to detect when the sod roll is ready to be released from the transport conveyor.

33. The system of claim 32, wherein the sensor is adapted to send a signal to the processor when the sensor detects a trailing edge of a sod strip being formed into the sod roll.

34. The system of claim 33, wherein, upon receiving the signal, the processor sends a command to the actuating assembly to move the tray from the retracted position to the extended position.

* * * * *

UNITED STATES PATENT AND TRADEMARK OFFICE
CERTIFICATE OF CORRECTION

| | |
|---|---|
| PATENT NO. | : 9,198,338 B2 |
| APPLICATION NO. | : 14/187868 |
| DATED | : December 1, 2015 |
| INVENTOR(S) | : Brouwer et al. |

Page 1 of 1

It is certified that error appears in the above-identified patent and that said Letters Patent is hereby corrected as shown below:

In Claim 18, line 14, the sentence "...the tray is slidable in a generally horizontally direction..." should read "...the tray is slidable in a generally horizontal direction..."

Signed and Sealed this
Twenty-third Day of February, 2016

Michelle K. Lee
*Director of the United States Patent and Trademark Office*